US011299933B2

(12) United States Patent
Petreman (10) Patent No.: US 11,299,933 B2
(45) Date of Patent: Apr. 12, 2022

(54) STEPS FORMING A SPIRAL STAIRCASE FOR A TREESTAND

(71) Applicant: Barry Petreman, Camden, TN (US)

(72) Inventor: Barry Petreman, Camden, TN (US)

(*) Notice: Subject to any disclaimer, the term of this patent is extended or adjusted under 35 U.S.C. 154(b) by 0 days.

(21) Appl. No.: 16/450,439

(22) Filed: Jun. 24, 2019

(65) Prior Publication Data
US 2021/0095524 A1    Apr. 1, 2021

Related U.S. Application Data (60) Provisional application No. 62/689,036, filed on Jun. 22, 2018.

(51) Int. Cl.
*E06C 1/34*    (2006.01)
*A01M 31/02*    (2006.01)

(52) U.S. Cl.
CPC ............... *E06C 1/34* (2013.01); *A01M 31/02* (2013.01)

(58) Field of Classification Search
CPC .......... E06C 1/34; E06C 1/381; A01M 31/02; A01M 31/025; A63B 27/00
See application file for complete search history.

(56) References Cited

U.S. PATENT DOCUMENTS

| | | | | |
|---|---|---|---|---|
| 792,623 A * | 6/1905 | Souder | .................... | B66B 21/06 198/327 |
| 3,513,992 A * | 5/1970 | Handler | .................. | E04H 6/287 187/250 |
| 5,518,083 A * | 5/1996 | Blennert | ................ | F16M 11/08 248/282.1 |
| 5,562,180 A * | 10/1996 | Herzog | .................. | A01M 31/02 182/187 |
| 5,806,626 A * | 9/1998 | Jenkins, Jr. | ............. | E06C 7/081 182/189 |
| 6,668,975 B2 * | 12/2003 | Skipper | ................... | E06C 7/006 182/189 |
| 6,668,977 B2 * | 12/2003 | Arsenault | ............. | A01M 31/02 182/187 |

(Continued)

FOREIGN PATENT DOCUMENTS

EP         3832794 A1 *  6/2021  ............... H01Q 1/08

OTHER PUBLICATIONS

U.S. Appl. No. 62/689,036, Petreman, Barry.

*Primary Examiner* — Daniel P Cahn
*Assistant Examiner* — Candace L Bradford
(74) *Attorney, Agent, or Firm* — Mark Pitchford; Eric Fugett; Pitchford Fugett, PLLC (57) ABSTRACT

A system for forming a step protruding from a post (e.g., tree) includes a spine, a post fastener, and a step. The spine is strapped or screwed to the post via the post fastener such that the spine extends generally parallel to the post (i.e., vertically). The spine includes a length of tubing and an alignment plate. The length of tubing extends vertically along the post when installed (i.e., assembled) on the post. The alignment plate is attached to the length of tubing, typically at one or both ends of the tubing. The alignment plate extends laterally from the length of tubing to limit rotation of the tubing about a vertical axis thereof by interacting with the post when the spine is installed on the post. The step engages the spine such that the step is supported by the spine when the system is installed on the post. The step extends generally perpendicularly from the spine and post.

19 Claims, 8 Drawing Sheets

(56) References Cited

U.S. PATENT DOCUMENTS

| | | | | |
|---|---|---|---|---|
| 6,725,972 B1* | 4/2004 | Kher | ................ | A01M 31/02 |
| | | | | 182/187 |
| 7,770,540 B2* | 8/2010 | Halpern | ................ | A01K 15/024 |
| | | | | 119/706 |
| 8,272,479 B1* | 9/2012 | Leach | ................ | A01M 31/02 |
| | | | | 182/187 |
| 8,397,867 B2* | 3/2013 | Benefield | ................ | E06C 7/16 |
| | | | | 182/115 |
| 8,556,035 B1* | 10/2013 | Kendall | ................ | E06C 1/381 |
| | | | | 182/189 |
| 9,493,957 B2* | 11/2016 | Miller | ................ | E04G 3/243 |
| 9,743,774 B1* | 8/2017 | Hauser | ................ | A47C 9/10 |
| 9,832,989 B2* | 12/2017 | Hillis | ................ | E06C 1/10 |
| 10,167,642 B2* | 1/2019 | Thompson | ................ | E04G 5/045 |
| 10,378,212 B1* | 8/2019 | Lawson | ................ | E04F 11/112 |
| 10,757,929 B1* | 9/2020 | Hauser | ................ | A47C 15/004 |
| 10,895,109 B2* | 1/2021 | Squires | ................ | E06C 1/381 |
| 2004/0112676 A1* | 6/2004 | Skipper | ................ | E06C 7/006 |
| | | | | 182/116 |
| 2005/0284044 A1* | 12/2005 | Ritchie | ................ | E04F 11/032 |
| | | | | 52/187 |
| 2007/0000191 A1* | 1/2007 | Arnold | ................ | E04F 11/032 |
| | | | | 52/187 |
| 2009/0095569 A1* | 4/2009 | Cooper | ................ | A01M 31/02 |
| | | | | 182/187 |
| 2009/0218165 A1* | 9/2009 | Maurer | ................ | A63B 27/04 |
| | | | | 182/112 |
| 2009/0277721 A1* | 11/2009 | Weir | ................ | A01M 31/02 |
| | | | | 182/115 |
| 2012/0211306 A1* | 8/2012 | Benefield | ................ | A01M 31/02 |
| | | | | 182/115 |
| 2016/0038789 A1* | 2/2016 | Cheyne | ................ | E06C 1/381 |
| | | | | 182/36 |
| 2016/0265276 A1* | 9/2016 | Hartman | ................ | E06C 7/48 |
| 2019/0055782 A1* | 2/2019 | Infalt | ................ | E06C 1/381 |
| 2021/0095524 A1* | 4/2021 | Petreman | ................ | E06C 1/381 |
| 2021/0131111 A1* | 5/2021 | Pocius | ................ | E04F 11/04 |
| 2021/0205667 A1* | 7/2021 | Garis | ................ | E06C 1/34 |
| 2021/0283467 A1* | 9/2021 | Booth | ................ | A63B 27/00 |

* cited by examiner

STEPS FORMING A SPIRAL STAIRCASE FOR A TREESTAND

CROSS-REFERENCES TO RELATED APPLICATIONS

This application claims priority to and hereby incorporates by reference in its entirety U.S. Provisional Patent Application Ser. No. 62/689,036 entitled "STEPS FORMING A SPIRAL STAIRCASE FOR A TREESTAND" filed on Jun. 22, 2018.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to climbing trees. More particularly, this invention pertains to systems for entering tree stands.

Traditional means of climbing trees or entering tree stands for hunting include ladders and climbing sticks. Ladders may be built into the tree or post, or a ladder may be attached to the tree stand. Similarly, climbing sticks or post or may be directly attached to the tree stand.

Screw in foot pegs are also available that allow a user to ascend and descend a tree stand. However, screw in foot pegs are difficult for some users to use because of the need to climb straight up the tree with the user's feet turned out to step on the pegs protruding from the tree trunk. People with a disability or mobility problems generally cannot hunt from tree stands because of the lack of means for ingress and egress.

Some attempts to address these issues have been made such as in U.S. Patent Publication No. 2012/0211306 filed Feb. 22, 2011 entitled "TREE STAND ADAPTED TO CREATE A SPIRAL STEP AROUND A TREE."

BRIEF SUMMARY OF THE INVENTION

Aspects of the present invention provide steps to form a spiral staircase for ingress and egress to a tree stand.

In one aspect, a system for forming a step protruding from a post (e.g., tree) includes a spine, a post fastener, and a step. The spine is strapped or screwed to the post via the post fastener such that the spine extends generally parallel to the post (i.e., vertically). The spine includes a length of tubing and an alignment plate. The length of tubing extends vertically along the post when installed (i.e., assembled) on the post. The alignment plate is attached to the length of tubing, typically at one or both ends of the tubing. The alignment plate extends laterally from the length of tubing to limit rotation of the tubing about a vertical axis thereof by interacting with the post when the spine is installed on the post. The step engages the spine such that the step is supported by the spine when the system is installed on the post. The step extends generally perpendicularly from the spine and post.

In another aspect, a stair system for a post includes a spine, a post fastener, and a step. The spine includes a length of tubing, and an alignment plate. The length of tubing is configured to extend generally vertically when the stair systems assembled on the post. The alignment plate is affixed to the length of tubing, and the alignment plate extends from the length of tubing such that the alignment plate limits rotation of the length of tubing about a longitudinal axis of the length of the tubing when the stair system is assembled on the post. The post fastener is configured to secure the spine to the post when the stair system is assembled on the post. The step is configured to engage the spine such that the step is supported by the spine when the stair systems assembled on the post.

In another aspect, a stair system for a post includes a plurality of spines, at least one post fastener, and a plurality of steps. Each spine of the plurality of spines includes a length of tubing and an alignment plate. The length of tubing is configured to extend generally vertically when the stair systems assembled on the post. The alignment plate is affixed to the length of tubing. The alignment plate extends from the length of tubing such that the alignment plate limits rotation of the length of the tubing about a longitudinal axis of the length of tubing when the stair system is assembled on the post. The at least one post fastener is configured to secure at least one spine of the plurality of spines to the post when the stair system is assembled on the post. Each step of the plurality of steps is configured to engage a spine of the plurality of spines such that the step is supported by the spine when the stair system is assembled on the post.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
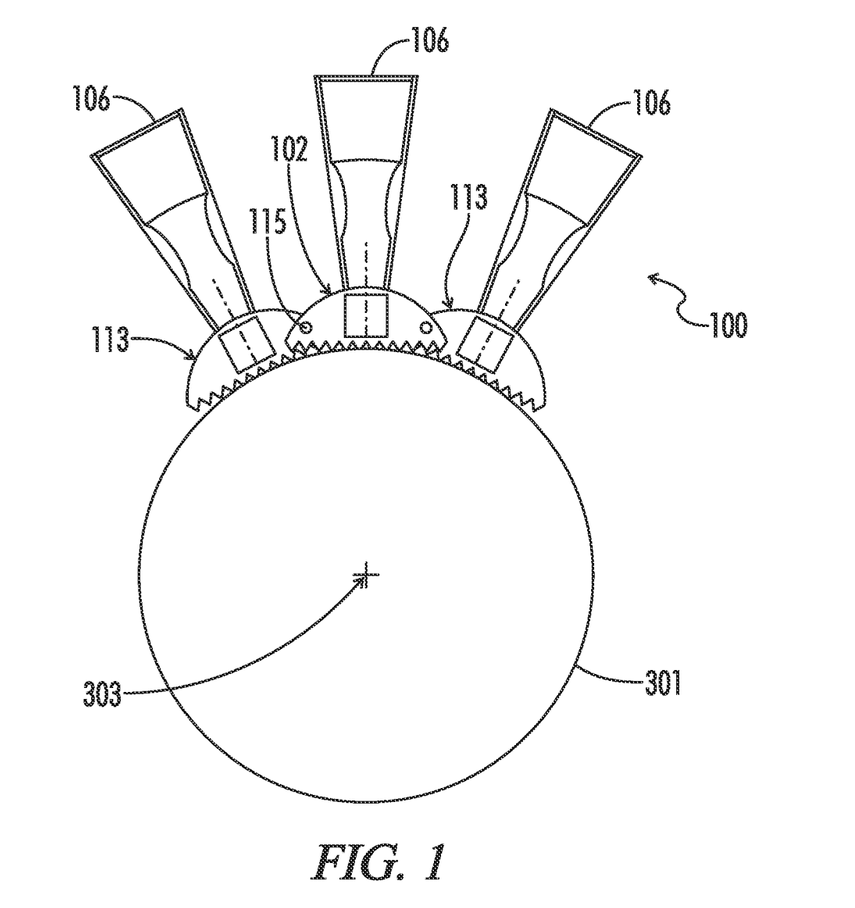
FIG. 1 is a top perspective view of a step system attached to a tree according to one embodiment of the invention.
Figure 2:
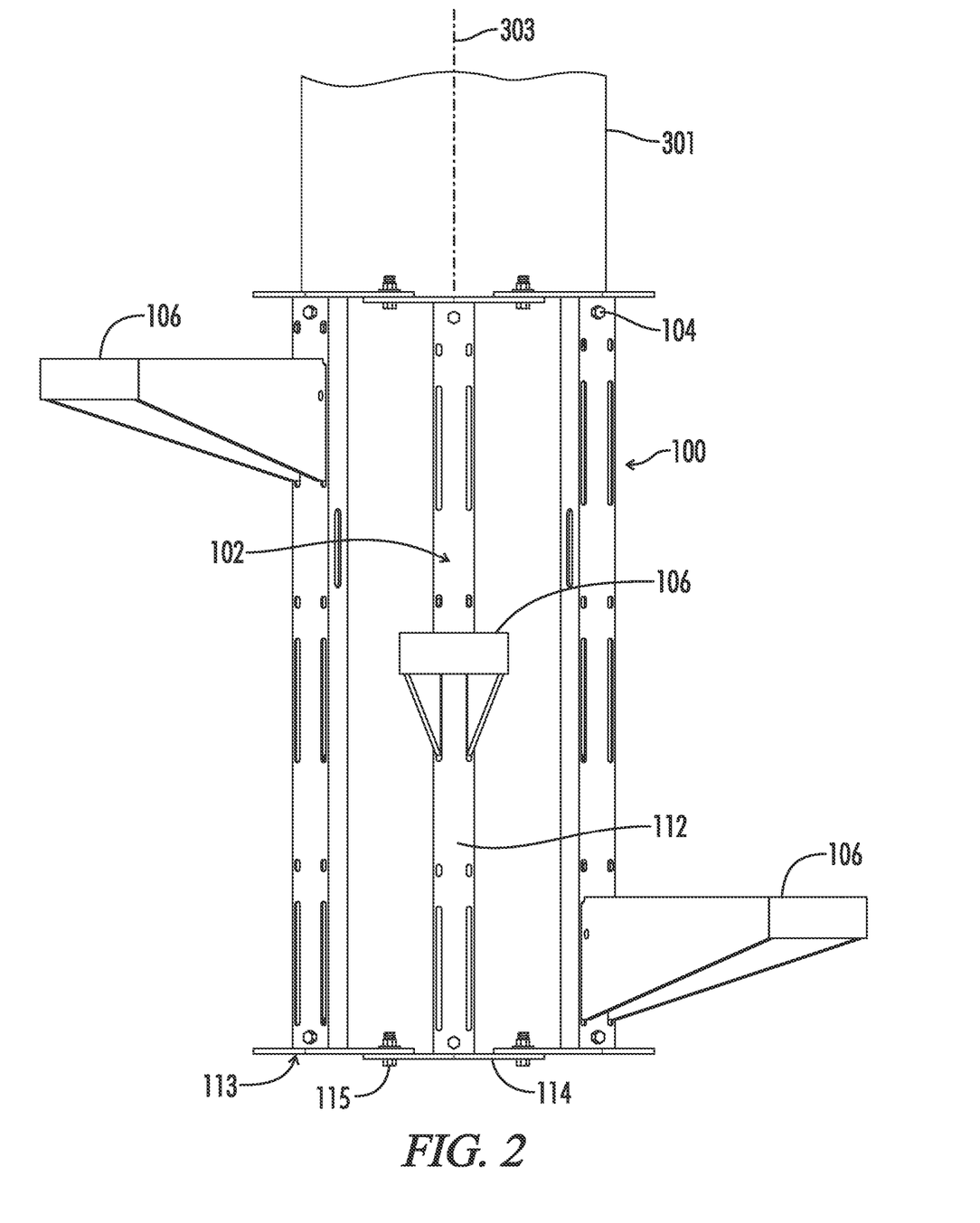
FIG. 2 is a side perspective view of the step system of FIG. 1.
Figure 3A:
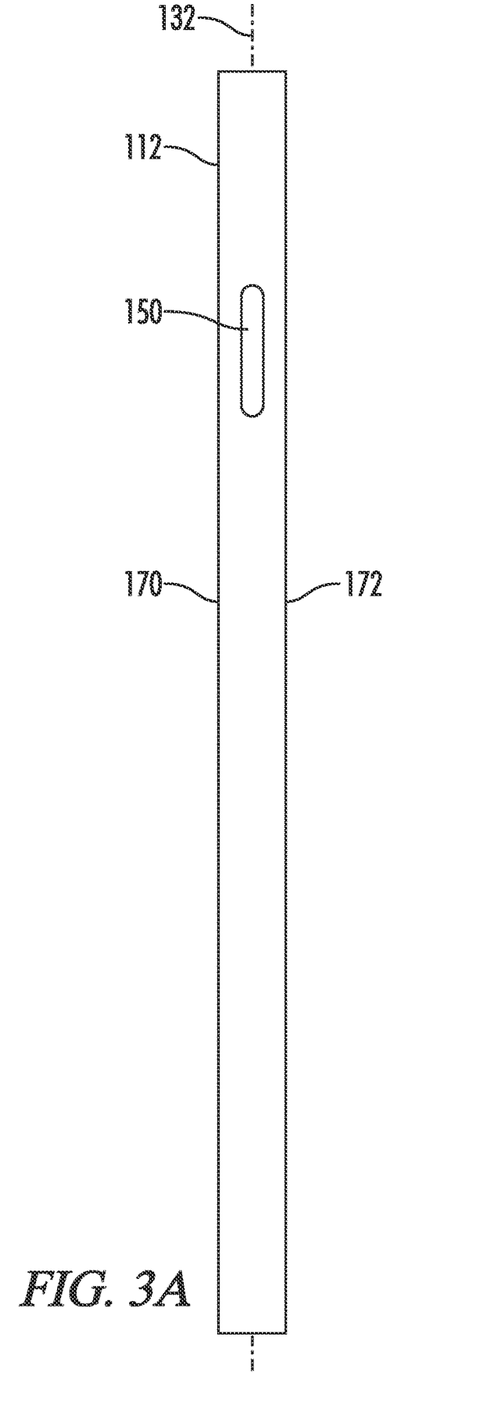
FIG. 3A is a side perspective view of a spine of the step system of FIG. 1.
Figure 3B:
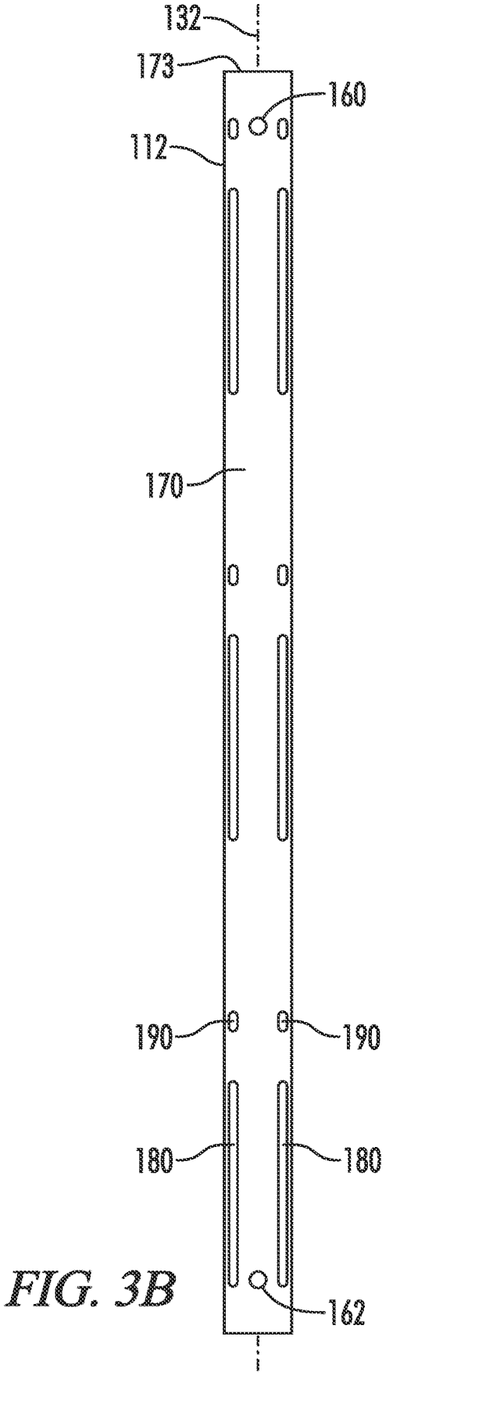
FIG. 3B is a front perspective view of the spine of FIG. 3A.
Figure 3C:
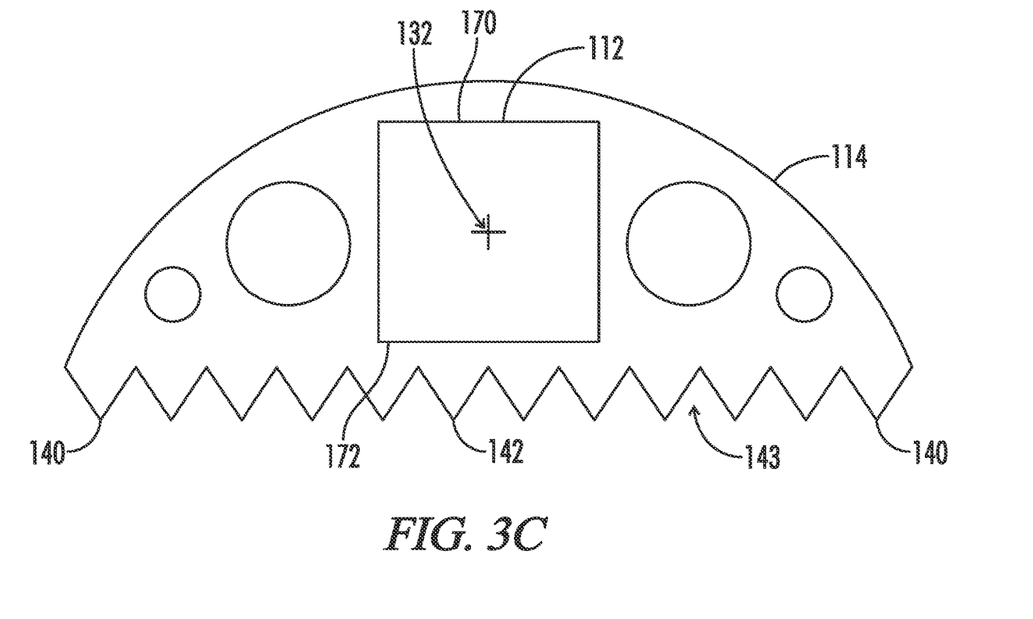
FIG. 3C is a top perspective view of the spine of FIG. 3A.
Figure 4A:
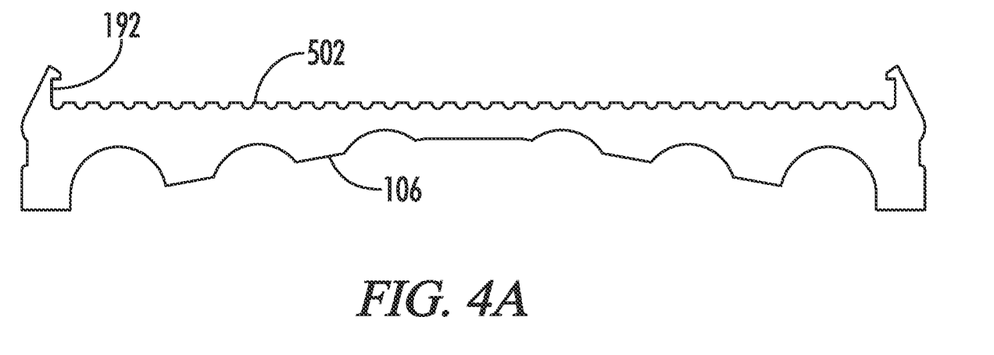
FIG. 4A is a side perspective view of a step for use with the spine of FIG. 1.
Figure 4B:
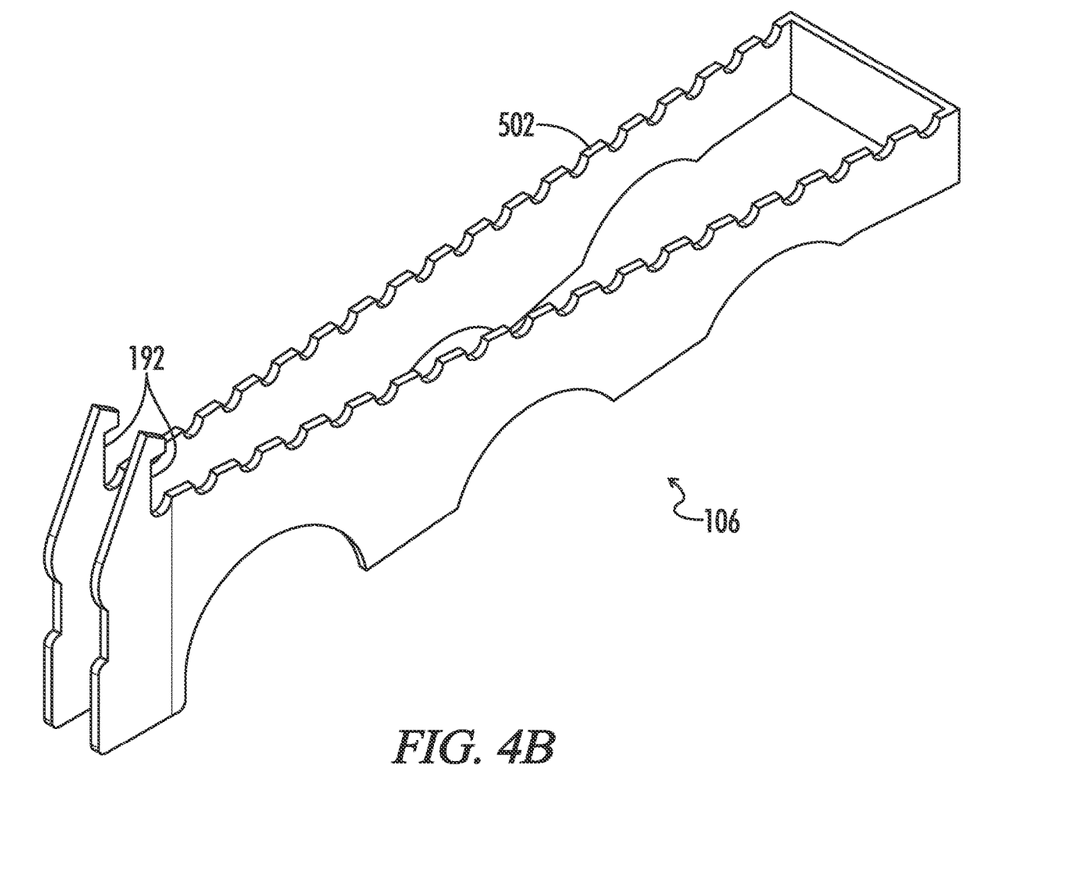
FIG. 4B is an isometric view of the step of FIG. 4A.
Figure 5:
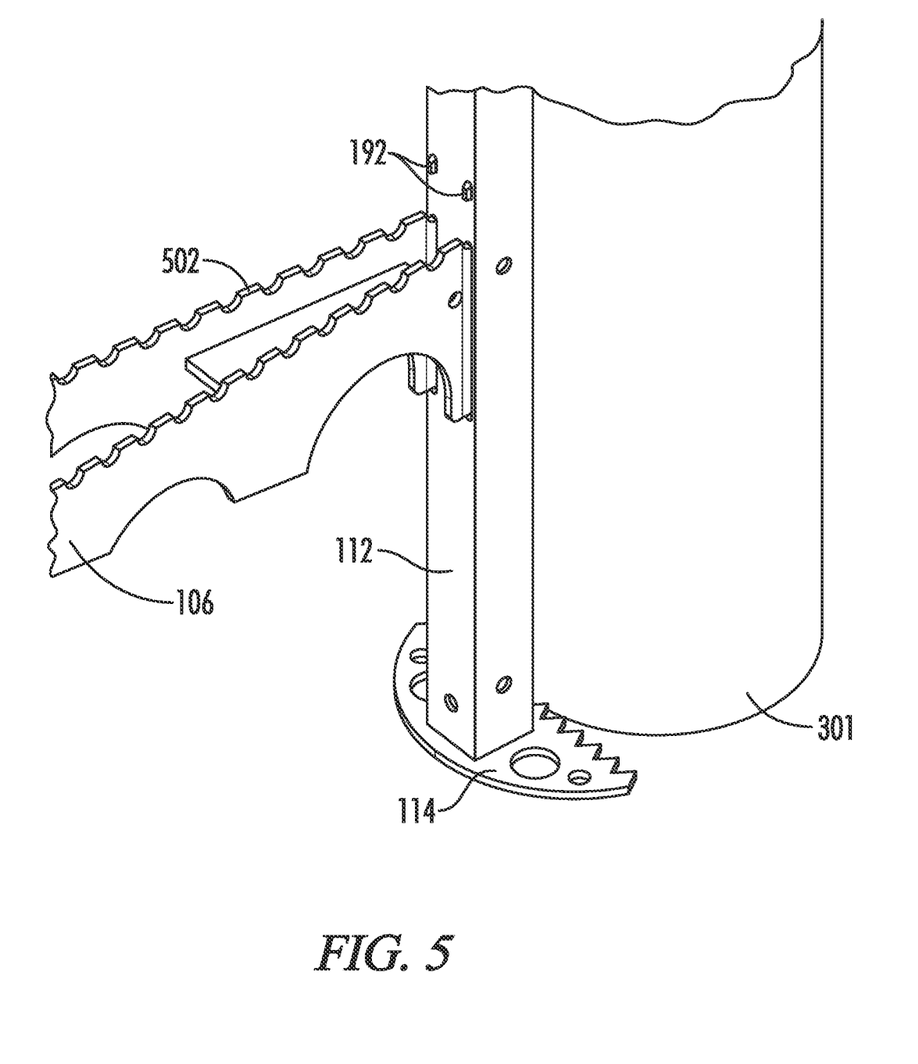
FIG. 5 is an isometric view of the spine of FIGS. 3A-3C installed on a tree or post with the step of FIGS. 4A and 4B affixed to the spine.
Figure 6:
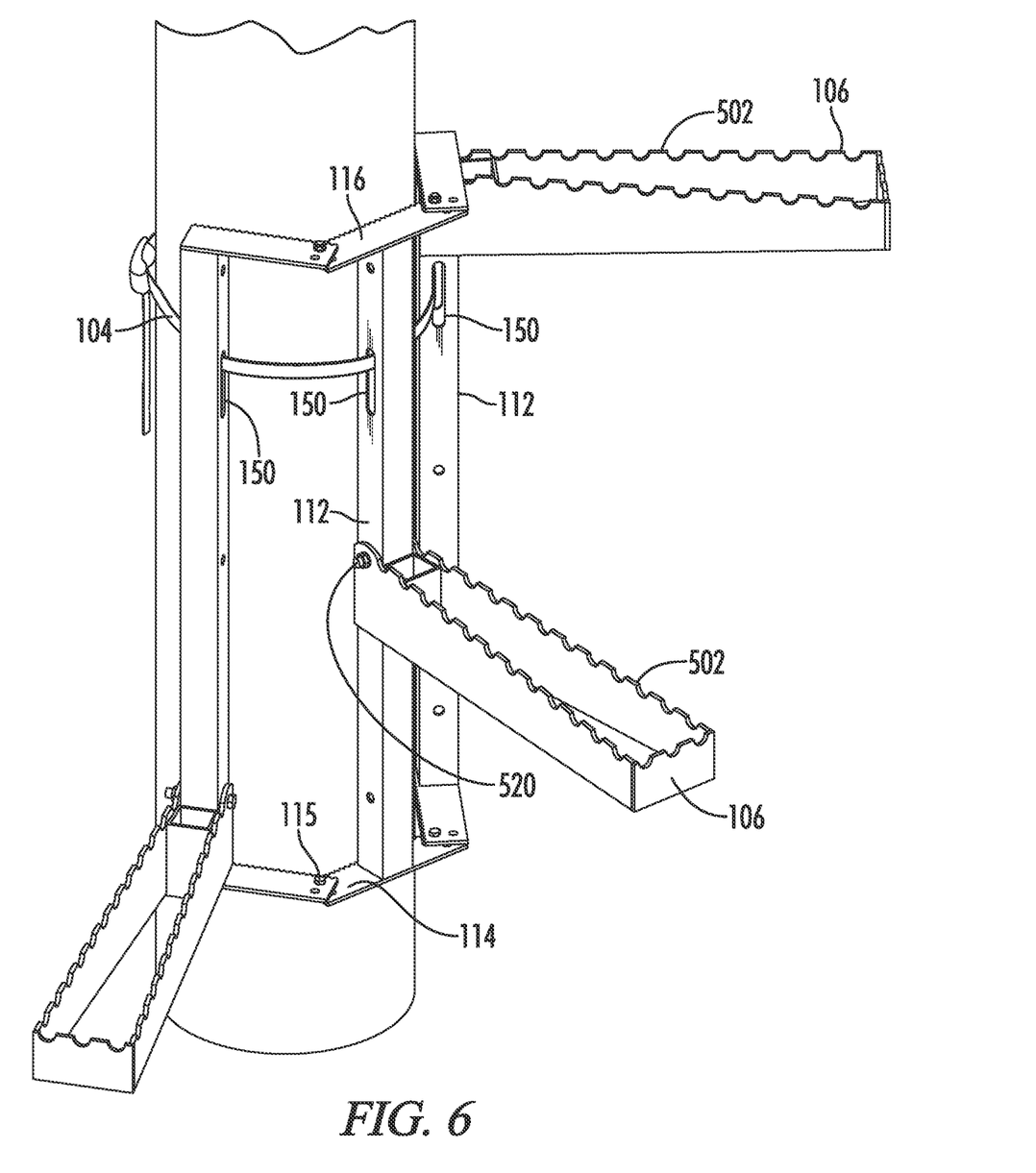
FIG. 6 is an isometric view of a series of spines and steps installed on a tree or post to create a spiral staircase according to one embodiment of the invention.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component. As used herein, the upright position of the stair system is when fastened to a tree generally vertically such that the step portion protrudes generally horizontally from the tree (see, for example, FIGS. 2 and 6).

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring to FIGS. 1-6, in one embodiment, a stair system 100 for a post 301 includes a spine 102, a post fastener 104, and a step 106. The spine 102 includes a length of tubing 112 and an alignment plate 114. The length of tubing 112 is configured to extend generally vertically when the stair system 100 is assembled on the post 301.

The alignment plate 114 is affixed to the length of tubing 112. The alignment plate 114 extends from the length of tubing 112 such that the alignment plate 114 limits rotation of the length of tubing 112 about a longitudinal axis of the length of tubing 112 when the stair system 100 is assembled on the post 301. The longitudinal axis of the length of tubing 112 extends generally vertically when the stair system 100 is assembled on the post 301. In one embodiment, the longitudinal axis of the length of tubing 112 extends generally parallel to a longitudinal axis 303 of the post 301 when the stair system 100 is assembled on the post 301. The alignment plate 114 extends generally horizontally from the length of tubing 112 when the stair system 100 is assembled on the post 301. In one embodiment, the alignment plate 114 has an end 140 that extends inward toward the central longitudinal axis 303 of the post 301 from the length of tubing 112 such that the end 140 of the alignment plate 114 is closer to the longitudinal axis of the post 301 than the length of tubing 112 (i.e., an inner face of the length of tubing) when the stair system 100 is assembled on the post 301. In one embodiment, the end 140 of the alignment plate 114 is also closer to the longitudinal axis 303 of the post 301 than a middle 142 of the alignment plate 114. That is, an inner face 143 of the alignment plate 114 is arcuate. In one embodiment, the interface 143 of the alignment plate 114 is serrated. In one embodiment, the alignment plate 114 is a first alignment plate, and the spine 102 further includes a second alignment plate 116 spaced longitudinally along the length of tubing 112 apart from the first alignment plate 114. In one embodiment, the first alignment plate 114 and second alignment plate 116 are at opposing longitudinal ends of the length of tubing 112.

In one embodiment, the spine 102 is a first spine, and the system 100 further includes a second spine 113. The system 100 also includes a pin 115 configured to connect the alignment plate of the first spine 102 to an alignment plate of the second spine 113 such that the spines extend circumferentially about the post 301 when the system 100 is assembled on the post 301.

The post fastener 104 is configured to secure the spine 102 to the post 301 when the stair system 100 is assembled on the post 301. In one embodiment, the length of tubing 112 has a pair of corresponding slots 150 in opposing lateral sides of the length of tubing 112, and the post fastener 104 is a strap configured to extend around the post 301 and through the pair of corresponding slots 150 in the opposing lateral sides of the length of tubing 112 of the spine 102 when the stair system 100 is assembled on the post 301. In one embodiment, the post fastener 104 includes a pair of straps configured to extend around the post 301 and the length of tubing 112, and the straps are longitudinally spaced apart from one another when the stair system 100 is assembled on the post 301. In another embodiment, the post fastener 104 is a screw (e.g., lag screw or bolt), and the length of tubing 112 has a whole 160 through an outer face 170 of the length of tubing 112 and a corresponding hole 162 through an inner face 172 of the length of tubing 112 configured to receive the screw 104. In one embodiment, the hole 160 in the outer face 170 of the length of tubing 112 is longitudinally offset toward a top 173 of the spine 112 when the stair system 100 is assembled on the post 301.

The step 106 is configured to engage the spine 102 such that the step 106 is supported by the spine 102 when the stair system 100 is assembled on the post 301. In one embodiment, the length of tubing 112 of the spine 102 has at least one pair of holes 180 in the outer face 170 of the length of tubing 112. The step 106 is configured to hook into the pair of holes 180 such that the step 106 is supported by the length of tubing 112 of the spine 102. In one embodiment, the pair of holes 180 is a pair of vertically extending slots through the outer face 170 of the length of tubing 112. Each slot of the pair of slots 180 has a matching lower elevation from ground when the stair system 100 is assembled on the post 301. In one embodiment, the length tubing 112 has a series of pairs of vertically extending slots along the outer face 170 of the length of tubing 112 different elevations from ground when the stair system 100 is assembled on the post 301. The step 106 is configured to hook into the spine 102 such that a stepping surface 502 extends generally perpendicular to the longitudinal axis 303 of the length of tubing 112. In one embodiment, the step 106 has a pair of hooks 192 configured to extend into an interior space of the length of tubing 112 through a first pair 180 of the at least 2 pair of holes in the outer face 170 of the length of tubing 112 and out from the interior space of the length of tubing 112 through a second pair 190 of the at least 2 pairs of holes in the outer face 170 of the length of tubing 112 such that the step 106 is supported by the length of tubing 112 of the spine 102 when the stair system 100 is assembled on the post 301 (see, for example, FIG. 5). In one embodiment, the step 106 is configured to hingedly engage the spine 102 via a bolt or pin 520 extending through the length of tubing 112 and the step 106. In one embodiment, the length of tubing 112 includes a plurality of hinge holes extending laterally therethrough configured to receive the Bolter pin 520 such that an elevation of the step 106 relative to the spine 102 may be adjusted when the stair system 100 is assembled on the post 301 (see, for example, FIG. 6).

In one embodiment, a system 100 for forming a step 106 protruding from a post (e.g., tree) 301 includes a spine 102, a post fastener 104, and a step 106. The spine 102 is strapped or screwed to the post 301 via the post fastener 104 such that the spine 102 extends generally parallel to the post (i.e., vertically) 301. The spine wanted to includes a length of tubing 112 and an alignment plate 114. The length of tubing 112 extends vertically along the post 301 when installed (i.e., assembled) on the post 301. The alignment plate 114 is attached to the length of tubing 112, typically at one or both ends of the tubing 112. The alignment plate 114 extends laterally from the length of tubing 112 to limit rotation of the tubing 112 about a vertical axis 132 thereof by interacting with the post 301 when the spine 102 is installed on the post 301. The step 106 engages the spine 102 such that the step 106 is supported by the spine 102 when the system 100 is installed on the post 301. The step 106 extends generally perpendicularly from the spine 102 and post 301.

In one embodiment, the step 106 secures to the spine 102 by extending into one set of slots 180 in the tubing 112 of the spine 102 and out of another set of slots 190 (above or below) the set of slots 180 which the step 106 extends into.

In one embodiment, the step 106 secures to the spine 102 via a bolt or pin 520 extending through the tubing 112 of the spine 102 and through the step 106.

In one embodiment, the adjacent spines 112, 113 are secured to one another via a bolt 115 through the plates of the respective spines.

In one embodiment, an edge 143 of the plate 114 of the spine 102 facing the post 301 is concave such that the alignment plate 114 contacts the post 301 near lateral edges 140 of the alignment plate 114 to prevent rotation of the tubing 112 of the spine 102 about the vertical axis 132 of the spine 102.

In one embodiment, the alignment plate 114 of the spine includes at least two protrusions from the edge 143 of the plate 114 facing the post near lateral edges 140 of the alignment plate such that the pair of protrusions engage the post 301 and prevent rotation of the tubing 112 of the spine wanted to about a vertical axis of the tubing 132.

In one embodiment, the spine 102 is secured to the post 301 by a strap 104.

In one embodiment, the spine 102 is secured to the post 301 via one or more lag screws 104.

In one embodiment, the tubing 112 of the spine 102 is approximately 1.5", ⅛" wall square tubing having a length of about 28".

In one embodiment, the tubing 112 of the spine 102 has at least 3 positions for receiving the step 106.

In one embodiment, the alignment plate 114 extends at least 6" laterally from a center of the tubing 112 of the spine 102 such that when alignment plates 114, 113 of adjacent spines are bolted or pinned together, the tubing of the adjacent spines is held at approximately 10" from one another.

In one embodiment, each spine has an upper alignment plate 116 and a lower alignment plate 114.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful STEPS FORMING A SPIRAL STAIRCASE FOR A TREESTAND it is not intended that such references be construed as limitations upon the scope of this invention except as set forth in the following claims.

What is claimed is:

1. A stair system for a post, said stair system comprising:
   a spine comprising:
      a length of tubing configured to extend generally vertically when the stair system is assembled on the post; and
      an alignment plate affixed to the length of tubing, said alignment plate extending from the length of tubing such that the alignment plate limits rotation of the length of tubing about a longitudinal axis of the length of the tubing when the stair system is assembled on the post;
   a post fastener configured to secure the spine to the post when the stair system is assembled on the post; and
   a step configured to engage the spine such that the step is supported by the spine when the stair system is assembled on the post, wherein:
      the spine is a first spine and the system further comprises:
         a second spine; and a pin configured to connect the alignment plate of the first spine to an alignment plate of the second spine such that the alignment plates extend circumferentially about the post when the system is assembled on the post.

2. The stair system of claim 1, wherein:
the longitudinal axis of the length of tubing extends generally vertically when the stair system is assembled on the post.

3. The stair system of claim 1, wherein:
the post has a longitudinal axis that extends generally vertically; and
the longitudinal axis of the length of tubing extends generally parallel to the longitudinal axis of the post when the stair system is assembled on the post.

4. The stair system of claim 1, wherein:
the alignment plate extends generally horizontally from the length of tubing when the stair system is assembled on the post.

5. The stair system of claim 1, wherein:
the alignment plate has an end that extends inward toward a central longitudinal axis of the post from the length of tubing such that the end of the alignment plate is closer to the longitudinal axis of the post than the length of tubing when the stair system is assembled on the post.

6. The stair system of claim 1, wherein:
the alignment plate has ends that extends inward toward a central longitudinal axis of the post from the length of tubing such that the ends of the alignment plate are closer to the longitudinal axis of the post than the length of tubing when the stair system is assembled on the post.

7. The stair system of claim 1, wherein:
the alignment plate is a first alignment plate; and
the spine further comprises a second alignment plate spaced longitudinally along the length of tubing apart from the first alignment plate.

8. The stair system of claim 1, wherein:
the length of tubing has a pair of corresponding slots in opposing lateral sides of the length of tubing; and
the post fastener comprises a strap configured to extend around the post and through the pair of corresponding slots in the opposing lateral sides of the length of tubing of the spine when the stair system is assembled on the post.

9. The stair system of claim 1, wherein:
the post fastener comprises:
a first strap configured to extend around the post and the length of tubing of the spine when the stair system is assembled on the post; and
a second strap configured to extend around the post and the length of tubing of the spine when the stair system is assembled on the post, wherein the first strap is spaced apart longitudinally along the length of tubing when the stair system is assembled on the post.

10. The stair system of claim 1, wherein:
the post fastener comprises a screw; and
the length of tubing has a hole through an outer face of the length of tubing and a corresponding hole through an inner face of the length of tubing configured to receive the screw.

11. The stair system of claim 1, wherein:
the post fastener comprises a screw;
the length of tubing has a hole through an outer face of the length of tubing and a corresponding hole through an inner face of the length of tubing configured to receive the screw;
the hole in the outer face of the length of tubing is longitudinally offset toward a top of the spine when the stair system is assembled on the post.

12. The stair system of claim 1, wherein:
the length of tubing of the spine has at least one pair of holes in an outer face of the length of tubing; and
the step is configured to hook into the pair of holes such that the step is supported by the length of tubing of the spine.

13. The stair system of claim 12, wherein:
the at least one pair of holes in the outer face of the length of tubing is a pair of vertically extending slots through the outer face of the length of tubing, each slot of the pair of slots having a matching lower elevation from ground when the stair system is assembled on the post.

14. The stair system of claim 13, wherein:
the length of tubing has a series of pairs of vertically extending slots along the outer face of the length of tubing at different elevations from ground when the stair system is assembled on the post.

15. The stair system of claim 1, wherein:
the length of tubing of the spine has at least one pair of holes in an outer face of the length of tubing; and
the step is configured to hook into the pair of holes such that the step is supported by the length of tubing of the spine and a stepping surface of the step extends generally perpendicular to the longitudinal axis of the length of tubing.

16. The stair system of claim 1, wherein:
the length of tubing of the spine has at least two pair of holes in an outer face of the length of tubing; and
the step is configured to extend into an interior space of the length of tubing through a first pair of the at least two pair of holes in the outer face of the length of tubing and out of the interior space of the length of tubing through a second pair of the at least two pairs of holes in the outer face of the length of tubing such that the step is supported by the length of tubing of the spine when the stair system is assembled on the post.

17. The stair system of claim 1, wherein:
the step is configured to hingedly engage the spine via a bolt or pin extending through the length of tubing and the step.

18. The stair system of claim 1, wherein:
the step is configured to hingedly engage the spine via a bolt or pin extending laterally through the length of tubing and the step; and
the length of tubing comprises a plurality of hinge holes extending laterally therethrough configured to receive the bolt or pin such that an elevation of the step relative to the spine may be adjusted when the stair system is assembled on the post.

19. A stair system for a post, said stair system comprising:
a plurality of spines, each spine comprising:
a length of tubing configured to extend generally vertically when the stair system is assembled on the post; and
an alignment plate affixed to the length of tubing, said alignment plate extending from the length of tubing such that the alignment plate limits rotation of the length of tubing about a longitudinal axis of the length of the tubing when the stair system is assembled on the post;

at least one a post fastener configured to secure at least one spine of the plurality of spines to the post when the stair system is assembled on the post;

a plurality of steps, each configured to engage a spine of the plurality of spines such that the step is supported by the spine when the stair system is assembled on the post; and a plurality of pins, each pin of the plurality of pins configured to connect the alignment plate of a first spine of the plurality of spines to an alignment plate of a second spine of the plurality of spines such that the alignment plates of the first and second spines extend circumferentially about the post when the system is assembled on the post.

* * * * *